(12) United States Patent
Sethi et al.

(10) Patent No.: US 10,860,209 B1
(45) Date of Patent: Dec. 8, 2020

(54) SELECTION AND CONFIGURATION OF ONE-HAND KEYBOARDS FOR TOUCH SCREEN DEVICES

(71) Applicant: Dell Products L.P., Round Rock, TX (US)

(72) Inventors: Parminder Singh Sethi, Punjab (IN); C Narasimhaiah, Bangalore (IN); Durai S. Singh, Chennai (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/711,740

(22) Filed: Dec. 12, 2019

(51) Int. Cl.
G06F 3/048 (2013.01)
G06F 3/0488 (2013.01)
G06F 3/0482 (2013.01)

(52) U.S. Cl.
CPC ........ G06F 3/04886 (2013.01); G06F 3/0482 (2013.01); G06F 2203/04803 (2013.01)

(58) Field of Classification Search
CPC ............. G06F 3/04886; G06F 3/04883; G06F 1/1673; G06F 3/0216
See application file for complete search history.

(56) References Cited

U.S. PATENT DOCUMENTS

| | | | | |
|---|---|---|---|---|
| 7,844,914 B2 * | 11/2010 | Andre | ................ | G06F 3/04883 715/773 |
| 10,216,286 B2 * | 2/2019 | Chornenky | ........... | G06F 3/0216 |
| 10,331,339 B2 * | 6/2019 | Yang | ................ | G06K 9/00416 |
| 2006/0085757 A1 * | 4/2006 | Andre | ................ | G06F 3/04883 715/771 |
| 2010/0241985 A1 * | 9/2010 | Kim | .................... | G06F 3/04886 715/773 |
| 2012/0162078 A1 * | 6/2012 | Ferren | ................ | G06F 3/04886 345/168 |
| 2013/0241838 A1 * | 9/2013 | Onishi | ............... | G06F 3/04883 345/169 |
| 2013/0257732 A1 * | 10/2013 | Duffield | .............. | G06F 3/04886 345/168 |
| 2014/0098024 A1 * | 4/2014 | Paek | ................... | G06F 3/04883 345/168 |
| 2015/0067572 A1 * | 3/2015 | Bai | ........................ | G06F 3/0482 715/773 |
| 2016/0283105 A1 * | 9/2016 | Maloo | ................ | G06F 3/04883 |
| 2017/0010806 A1 * | 1/2017 | Pingco | ................ | G06F 3/04883 |
| 2017/0052702 A1 * | 2/2017 | Norris, III | ......... | G06F 3/04886 |
| 2017/0235482 A1 * | 8/2017 | Ferren | ..................... | G06F 21/40 715/773 |
| 2017/0357443 A1 * | 12/2017 | Paek | ...................... | G06F 3/0482 |
| 2019/0265887 A1 * | 8/2019 | Yang | ..................... | G06F 3/0216 |

* cited by examiner

Primary Examiner — Linh K Pham
(74) Attorney, Agent, or Firm — Terrile, Cannatti & Chambers; Jonathan N. Geld (57) ABSTRACT

A mechanism for determining whether a user should be using a single-hand virtual keyboard for a large-format touch screen device is provided. Additionally, a mechanism is provided to determine whether the single-hand virtual keyboard should be configured for a left-handed or a right-handed user. Further, a mechanism is provided to determine an appropriate size for the single-hand virtual keyboard for a particular user. In this manner, embodiments provide an input mechanism that allows for efficient and comfortable typing on a large-format touch screen device.

16 Claims, 7 Drawing Sheets

SELECTION AND CONFIGURATION OF ONE-HAND KEYBOARDS FOR TOUCH SCREEN DEVICES

BACKGROUND OF THE INVENTION

Field of the Invention

The present invention relates to information handling systems. More specifically, embodiments of the invention relate to selection of a type of one-hand keyboard for a touch screen device and configuration of that keyboard.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Large-format touch screen computers, such as tablets, are used to access information handling system information in a variety of applications, such as hospital record updating, automobile service organizations, laptop computer replacements, and the like. Use of large-format touch screen computers continues to increase as the number of applications specifically designed for such platforms increases, and by 2021, there may be as many as 1.3 billion users of such devices.

While large-format touchscreen computers may be popular, productivity on such devices suffers primarily due to a lack of a good input mechanism. On a physical keyboard, an average person can type as many as 40 words per minute (wpm). But on a virtual keyboard displayed by a tablet computer, an average person types about 20 wpm. This reduction in typing speed can be attributed to the cumbersome nature of typing on a device that a user also is holding, and the orientation and feel of the virtual keyboard can make it more difficult to type.

It is therefore desirable to have an improved mechanism for inputting information to a large-format touchscreen computer. It is further desirable to have such a mechanism be adjustable to how the user type and limitations of the user's reach across the touchscreen of the device.

SUMMARY OF THE INVENTION

A system, method, and computer-readable medium are disclosed for a virtual keyboard that can be used by a single hand on any touch-enabled device, where embodiment provide an automatic determination of the desirability for a single-hand keyboard, whether the keyboard should be right- or left-handed, and the appropriate size for the keyboard user.

In one embodiment, a computer-implementable method for selecting a virtual keyboard for a touchscreen device is provided, where the method includes: monitoring flight times between keys of a first virtual keyboard displayed on a touchscreen display of the touchscreen device; determining by a processor in the touchscreen device that a single-hand virtual keyboard is indicated if flight times are different for defined regions of the first virtual keyboard; determining by the processor that a single-hand virtual keyboard is not indicated if flight times are not different for the defined regions of the first virtual keyboard; and displaying on the touchscreen display the single-hand virtual keyboard in response to said determining that the single-hand virtual keyboard is indicated.

In one aspect of the above embodiment, the monitoring includes storing flight times for virtual keyboard key pairs where a flight time includes a time between release of a first key of a key pair and touching a second key of the key pair. In another aspect of the above embodiment, the first virtual keyboard is a virtual keyboard that extends a full width of the touchscreen display. In a further aspect, the defined regions include a center region, a left region, and a right region. In still a further aspect, determining that a single-hand virtual keyboard is indicated further includes determining that a left-hand keyboard is indicated when flight times from the center region to the left region are less than flight times from the center region to the right region, and determining that a right-hand keyboard is indicated when flight times from the center region to the right region are less than flight times from the center region to the left region.

Another aspect of the above embodiment includes providing user-selection of a single-hand virtual keyboard if a single-hand virtual keyboard is not indicated where the user selection further includes selecting a left-hand or a right-hand keyboard. In another aspect, the method includes determining by the processor a first portion of the touchscreen display corresponding to an area of the first virtual keyboard having minimum flight times between keys, and locating the single-hand virtual keyboard in the first portion of the touchscreen display. In yet a further aspect, all keys of the single hand virtual keyboard are in the first portion of the touchscreen display. In still a further aspect, displaying the single-hand virtual keyboard includes displaying an arc-shaped virtual keyboard, and an outermost row of keys of the arc-shaped virtual keyboard are displayed in an arc defined by the keys of the first virtual keyboard having the minimum flight time.

Another embodiment provides a hand-held computing system that includes a processor, a touch screen display configured to display a virtual keyboard generated by the processor, a data bus coupled to the processor and the touchscreen display, and a non-transitory, computer-readable storage medium coupled to the data bus. The storage medium stores computer program code executable by the processor where the program code includes instructions configured to: monitor flight times between keys of a first virtual keyboard displayed on the touchscreen display; determine that a single-hand virtual keyboard is indicated if flight times are different for defined regions of the first virtual keyboard; determine that the single-hand virtual keyboard is not indicated if flight times are not different for the defined regions of the first virtual keyboard; and, display, on the touchscreen display, the single-hand virtual keyboard in response to said determining that the single-hand virtual keyboard is indicated.

In one aspect of the above embodiment, the program code instructions configured to monitor flight times includes further instructions configured to store flight times for virtual keyboard key pairs where a flight time includes a time between release of a first key of a key pair and touching a second key of the key pair. In another aspect, the first virtual keyboard is a virtual keyboard that extends a full width of the touchscreen display. In a further aspect, the defined regions include a center region, a left region, and a right region. In still a further aspect, the program code instructions configured to determine that a single-hand virtual keyboard is indicated includes further instructions configured to determine that a left-hand keyboard is indicated when flight times from the center region to the left region are less than flight times from the center region to the right region, and determine that a right-hand keyboard is indicated when flight times from the center region to the right region are less than flight times from the center region to the left region.

In another aspect of the above embodiment, the program code includes further instructions configured to provide user-selection of a single-hand virtual keyboard if a single-hand virtual keyboard is not indicated where said user selection further includes selecting a left-hand or a right-hand keyboard. In another aspect, the program code includes further instructions configured to determine a first portion of the touchscreen display corresponding to an area of the first virtual keyboard having minimum flight times between keys, and locate the single-hand virtual keyboard in the first portion of the touchscreen display. In a further aspect, all keys of the single-hand virtual keyboard are in the first portion of the touchscreen display. In yet a further aspect, displaying the single hand virtual keyboard includes displaying an arc-shaped virtual keyboard, and an outermost row of keys of the arc-shaped virtual keyboard are displayed in an arc defined by the keys of the first virtual keyboard having the minimum flight time.

In another embodiment, a computer-implementable method for providing a virtual keyboard for a touchscreen device is provided, where the method includes: monitoring flight times between keys of a first virtual keyboard displayed on a touchscreen display of the touchscreen device; determining, by a processor in the touchscreen device, a first portion of the touchscreen display corresponding to an area of the first virtual keyboard having minimum flight times between keys; and, displaying a single-hand virtual keyboard in the first portion of the touchscreen display. In one aspect of this embodiment, displaying the single-hand virtual keyboard includes displaying an arc-shaped virtual keyboard, and an outermost row of keys of the arc-shaped virtual keyboard are displayed in an arc defined by the keys of the first virtual keyboard having the minimum flight time.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system and method are disclosed for determining whether a user should be using a single-hand virtual keyboard for a large-format touch screen device. Embodiments further provide a mechanism to determine whether the single-hand virtual keyboard should be configured for a left-handed or a right-handed user. Further, embodiments provide a mechanism to determine an appropriate size for the single-hand virtual keyboard for a particular user. In this manner, embodiments provide an input mechanism that allows for efficient and comfortable typing on a large-format touch screen device.

Large-format touch screen devices are increasingly popular for applications requiring both mobility and a significant amount of screen area to display information to a user. Large-format touchscreen devices include, principally, tablet computers and large mobile phones (e.g., devices having a screen greater than 17.5 centimeters diagonal). One drawback of such devices, however, is that a displayed input device, such as a virtual keyboard, are not configured for efficient entry of information.

Figure 1:
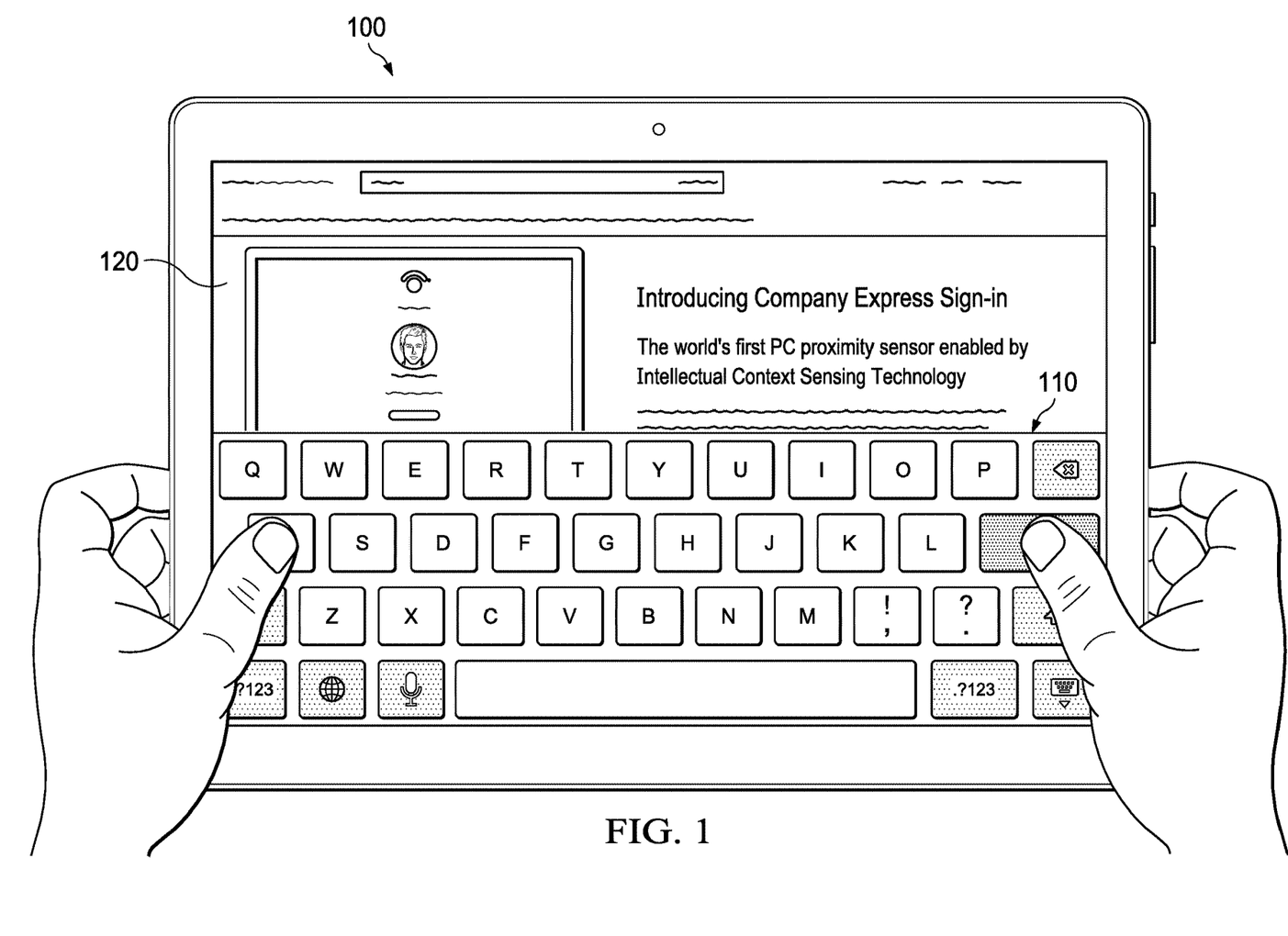
FIG. 1 is a simplified block diagram illustrating an example of a large-format touchscreen device, displaying a typical full-width keyboard.

FIG. 1 is a simplified block diagram illustrating an example of a large-format touchscreen device 100, displaying a typical full-width keyboard. Full-width keyboard 110 extends across the landscape-oriented device and is displayed over a significant portion of the screen real estate, obscuring application content 120. In order to see portions of the application content, a user may need to scroll up or down to fill in fields in forms, read information, and observe graphical data. As illustrated, tablet devices are typically held with both hands, but to type information onto the full-width keyboard, a user holds the tablet using one hand and types using the other hand. In many cases, the size of the keypad is not customizable to take into account, for example, the reach of a user's fingers and the regions of finger contact by different users.

In light of the shortcomings of a full-width keyboard 110, some methods have been proposed in the art. For example, a user can place the large-format touch screen device on a flat surface or display stand and type using both hands or a physical add-on the keyboard can be coupled to the device for typing with both hands. Alternative keyboards have been presented that include predictive text recommendations to improve entry of information or swipe keyboards that avoid touch typing. In addition, avoiding the use of a keyboard altogether for input through the use of, for example, handwriting recognition and voice-to-text. None of these alternative input mechanisms take into account a user's physical attributes and limitations in configuring a large-format touchscreen device to improve the input of information to such a device.

Figure 2:
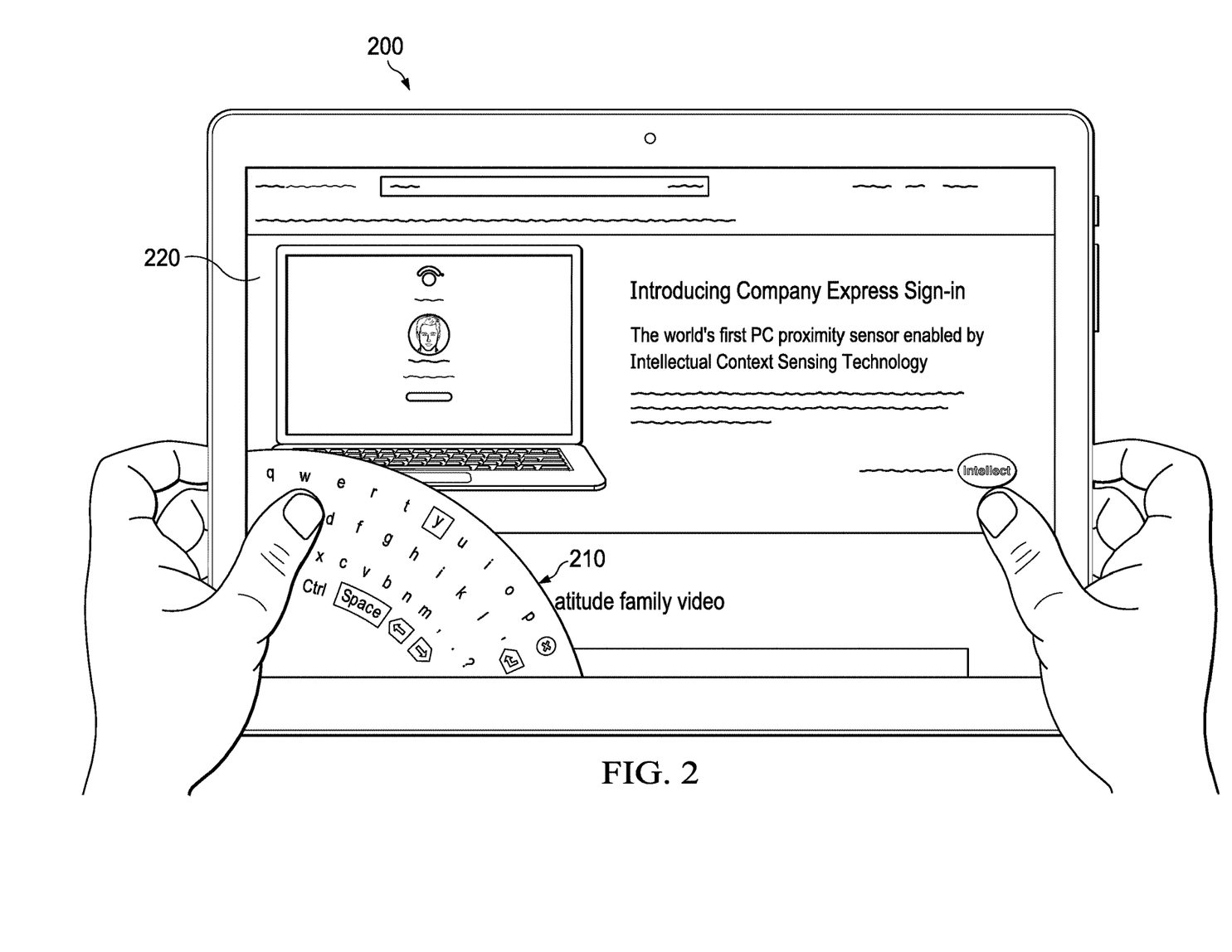
FIG. 2 is a simplified block diagram illustrating an example of a large-format touchscreen device, displaying a single-hand keyboard.

FIG. 2 is a simplified block diagram illustrating an example of a large-format touchscreen device 200, displaying a single-hand keyboard 210 configured to improve input efficiency to the device by taking into account biometric information associated with the user, providing an adjustable size of the single-hand keyboard, and allowing more application content 220 to be viewed. An arc-shaped single-hand keyboard 210 is provided that can be used on either the bottom right or bottom left of the screen. A determination is made by the system as to whether a user is right- or left-handed and as to a region of the screen in which the user types most quickly. As can be seen in FIG. 2, a more significant amount of screen real estate can be dedicated to the displayed application, rather than being obscured by the keyboard.

Embodiments of the present invention can improve use of a large-format touchscreen device in several ways. Embodiments can automatically predict a need for a single-hand keyboard by analyzing typing patterns of a user, including whether a user is right or left-handed. The default size of the keyboard can also be automatically determined using the typing patterns. Embodiments can alternatively allow a user to manually select a type and size of keyboard or define those applications in which a single-hand keyboard is desirable.

Figure 3:
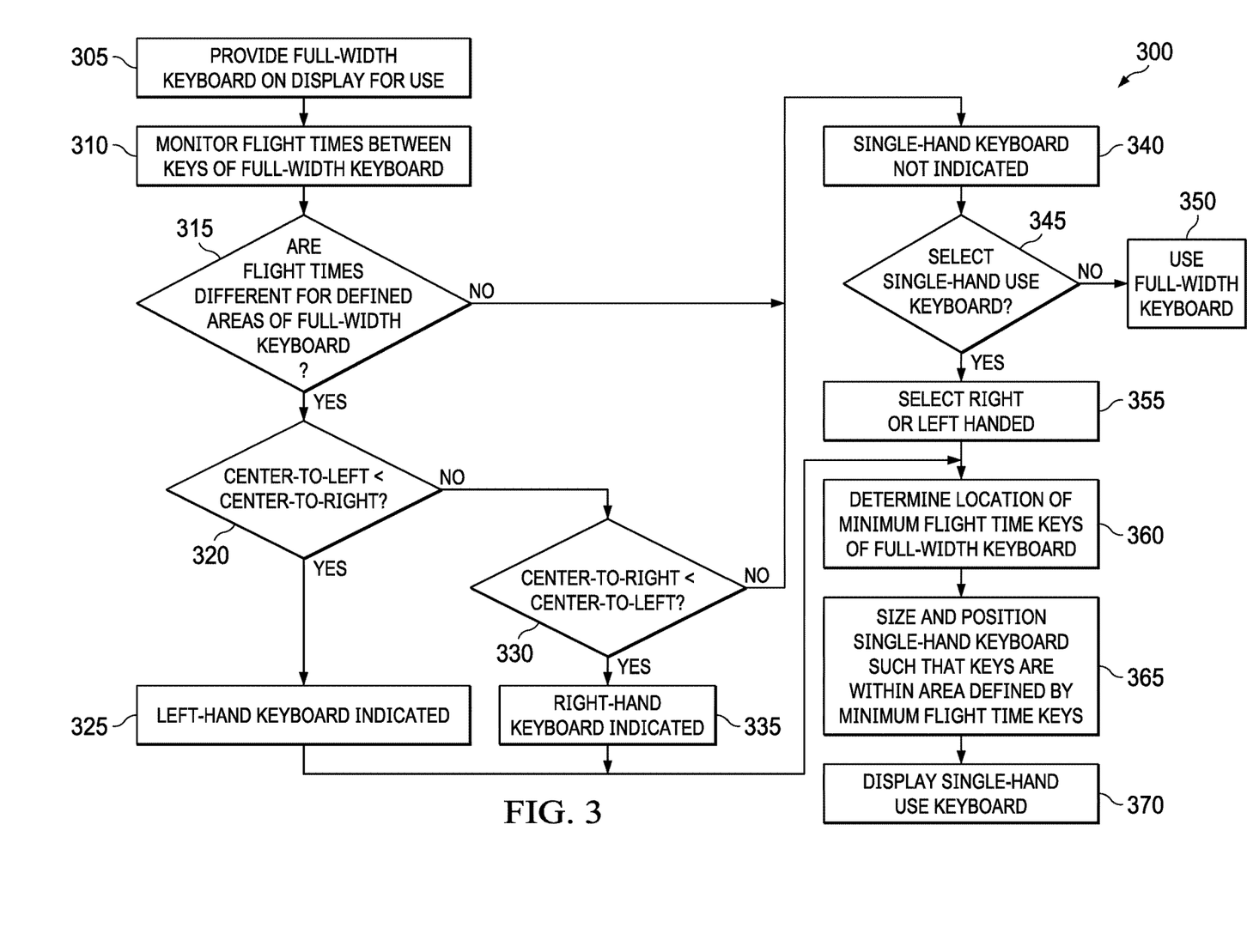
FIG. 3 is a simplified flow diagram illustrating a method to determine whether a single-hand keyboard is desirable and to configure that keyboard based upon user biometric information.

FIG. 3 is a simplified flow diagram 300 illustrating a method usable by embodiments of the present invention to determine whether a single-hand keyboard is desirable and to configure that keyboard based upon user biometric information. Initially, a full-width keyboard can be provided on the display of a large-format touchscreen device for information entry by a user (305). During use of the full-width keyboard, the system monitors flight times between keys of the full-width keyboard (310). Flight times, as used by embodiments of the present invention, are a time a user takes to release a key and to press another key on the keypad. For a single-handed touch typist, this can be a time required for the typist's finger to move from a first key to a second key. Information related to pairs of keys and flight time can be stored in a memory of a device that implements an embodiment of the present invention.

Figure 4:
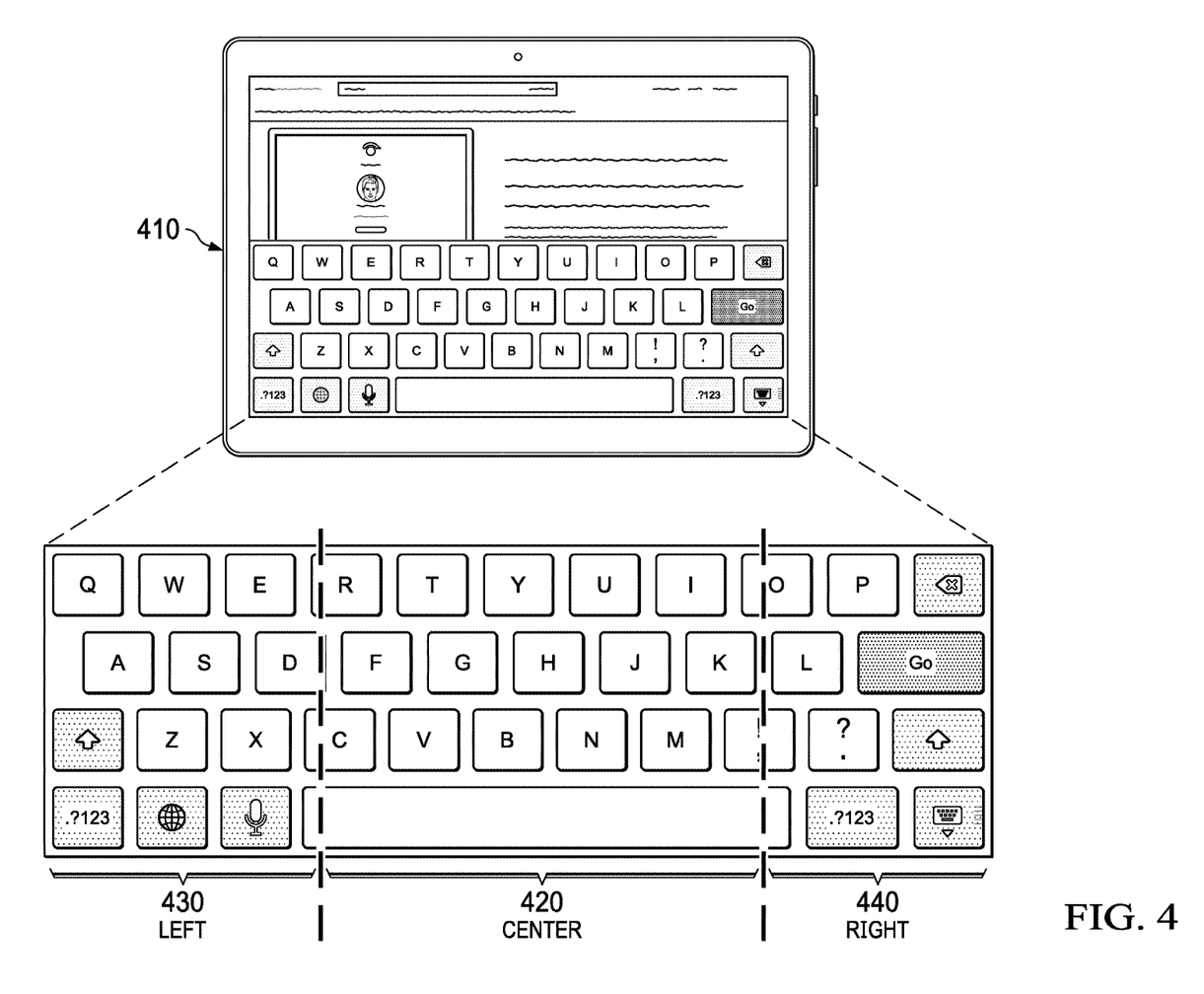
FIG. 4 is a simplified block diagram illustrating an example of a set of defined areas of a fullwidth keyboard that can be used for this determination.

After a sufficient period of time monitoring keyboard use, a determination is made as to whether flight times are different for defined areas of the full-width keyboard (315). FIG. 4 is a simplified block diagram illustrating an example of a set of defined areas of a fullwidth keyboard 410 that can be used for this determination. A center region 420, left region 430, and right region 440 of keyboard 410 are defined. Differing applications can implicate differing boundaries of the center, left, and right regions in light of the nature of the expected inputs. In making the analysis at step 315, the system determines whether there is a statistically significant difference in flight times between keys in center region 420 with keys either in left region 430 or right region 440. If there is a statistically significant difference in flight times, then a determination is made as to whether flight times between keys in center region 420 and left region 430 are less than flight times between keys in center region 420 and right region 440 (320). If that is the case, then a left-hand keyboard is indicated (325). If that is not the case, then a determination is made as to whether flight times between keys in center region 420 and right region 440 are less than flight times between keys in center region 420 and left region 430 (330). If that is the case, then a right-hand keyboard is indicated (335). If that is not the case, then a single hand keyboard is not indicated (340). A single hand keyboard may also be not indicated if flight times are not different for defined areas of the fullwidth keyboard (315).

In the case where a single-hand keyboard is not indicated (e.g. step 340), then a user can be given an option to select whether they wish to use a single-hand keyboard (345). If the user does not wish to use a single hand keyboard, then the user can continue to use the full-with keyboard (350). If the user wishes to use a single-hand keyboard, then they can select either a right- or left-hand keyboard (355).

Once automated selection of right- or left-hand keyboard (325, 335) or manual selection of right- or left-hand keyboard has occurred (355), the system can determine locations of minimum flight time keys of the full-with keyboard (360). In this step, the system analyzes all flight times between keys on the full-with keyboard to determine fastest times of flight. Alternatively, after having made a determination of left or right handedness, the system can analyze flight times between keys on the side of the full-with keyboard corresponding to the determined handedness. In addition, flight times can be analyzed in comparison to either an average of the user's aggregate flight times, or against a predetermined population average for flight times between particular keys on either the right- or left-hand side.

Figure 5:
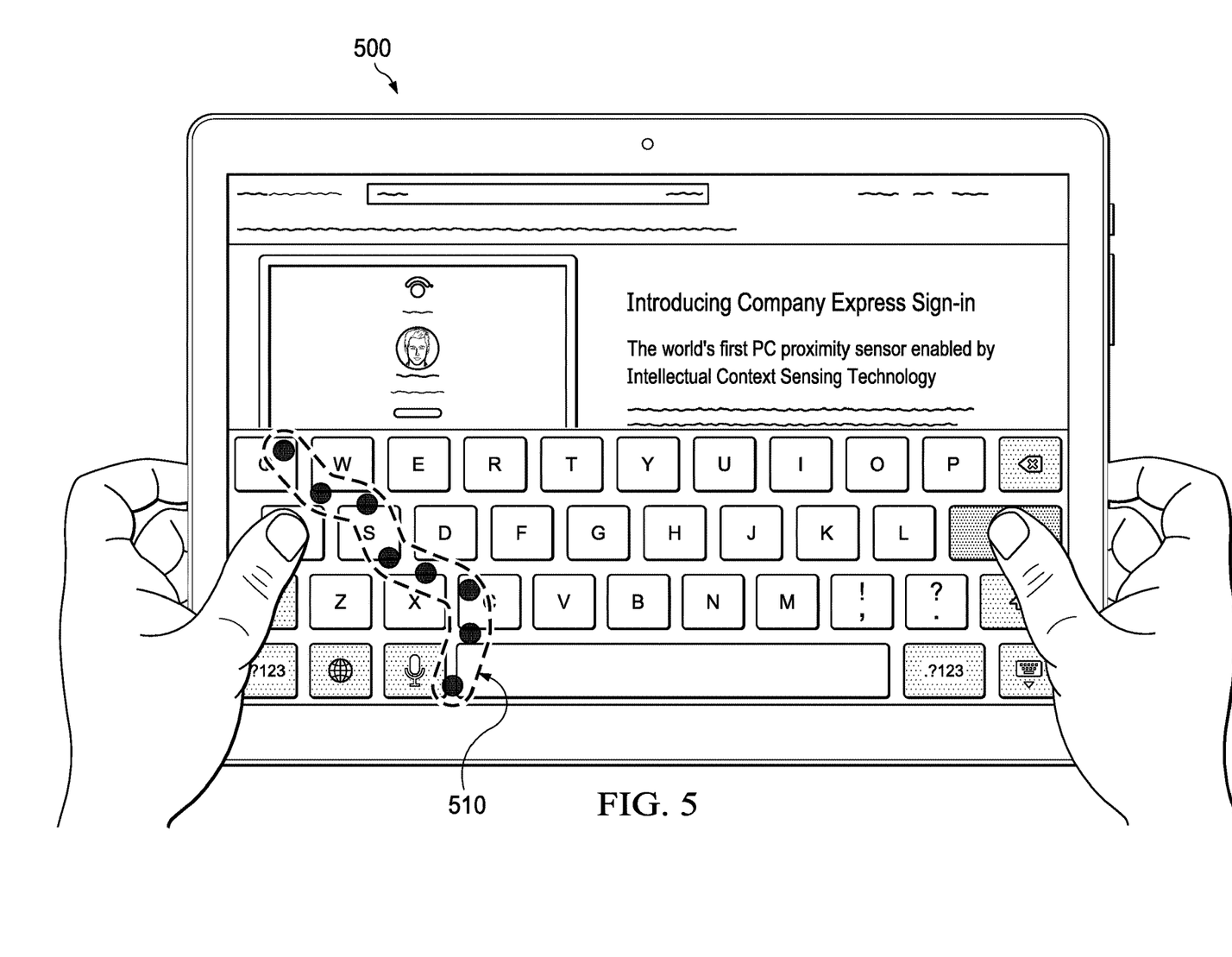
FIG. 5 is a simplified block diagram illustrating an example of a set of minimum flight time keys of a full-width keyboard.

FIG. 5 is a simplified block diagram illustrating an example of a set of minimum flight time keys 510 of a full-width keyboard 500 usable by an embodiment of the present invention. This set of keys is representative of a region on the keyboard where a user's performance is higher than the average of the comparison set, as discussed above. Once a set of minimum flight time keys have been determined, the single-hand keyboard can be sized and positioned such that the keys of the single-hand keyboard are within an area defined by the minimum flight time keys (365). In one embodiment of the present invention, a quarter oval or quarter circle shaped keyboard is used. An arc can be created using the minimum flight time keys to define the outer edge of the quarter oval or quarter circle with a corner of the device as the center. An outer row of keys can lie upon the arc determined from the minimum flight times. The system can then display the single-hand use keyboard in the determined area and of the determined size (370).

Figure 6:
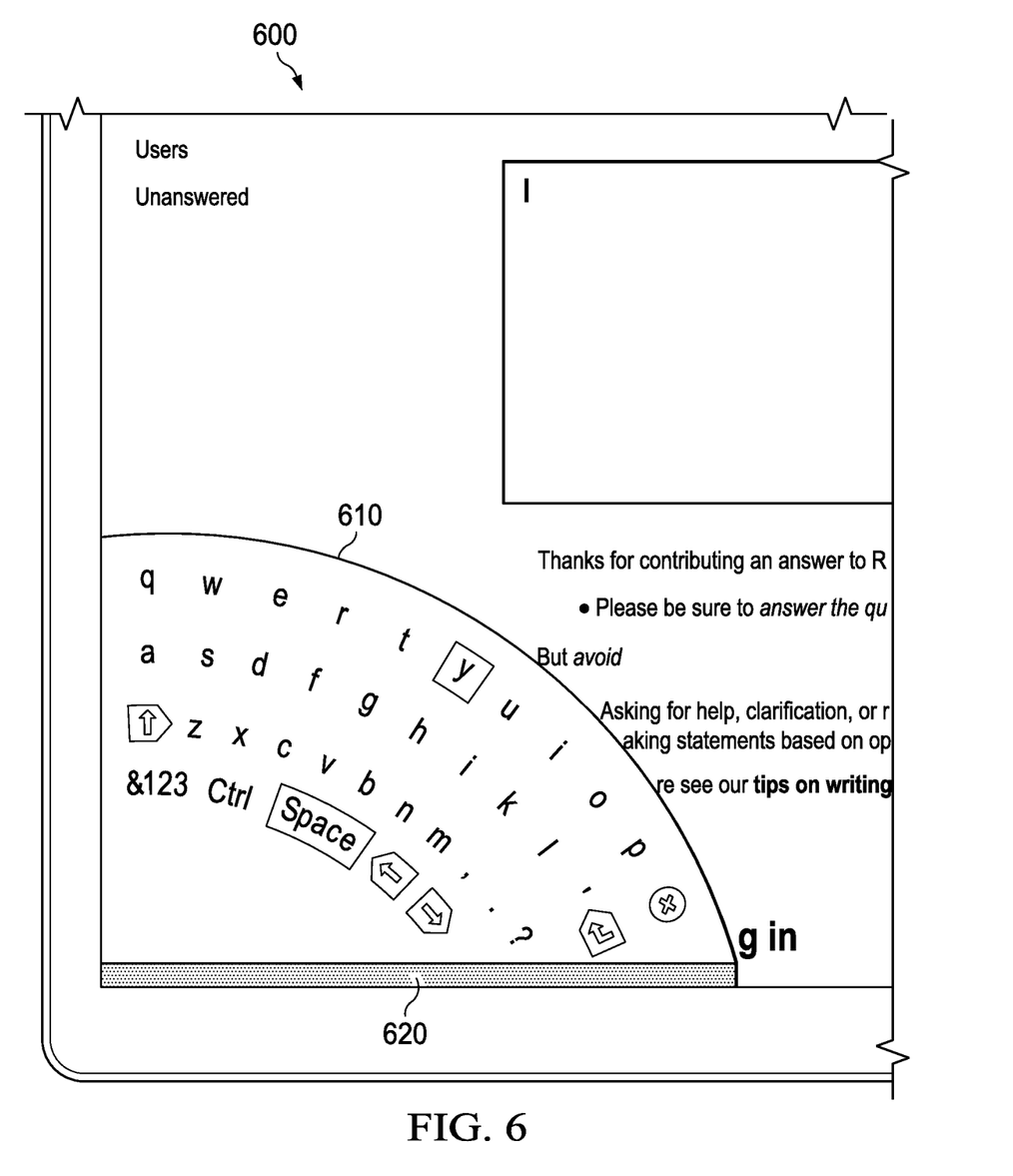
FIG. 6 is a simplified block diagram illustrating an example of a quarter oval or quarter circle-shaped keyboard.

FIG. 6 is a simplified block diagram illustrating an example of a quarter oval or quarter circle-shaped keyboard provided by an embodiment of the present invention. Single-hand keyboard 610 is provided on a portion of display 600. As discussed above, based on the radius of the arc determined by the keys having minimum flight time, the size of the keyboard can be derived. In this manner, the keypad size is tailor-made for the user. An arc-shaped keyboard provides a couple of advantages over rectangular shaped keyboards. For users who type on a touchscreen with their thumbs, the thumb follows a circular motion in the corner region of a large-format touchscreen device. Therefore, the keyboard follows the natural motion of the thumb. In addition, a circular design has the keys in concentric circles or arcs. This allows more keys to be displayed in a smaller area without compromising the size. That is, a size of a key on the smallest arc of the keyboard can be the same as a size of the keys on the outer arc of the keyboard. Further, as discussed above, the arc-shaped keyboard can increase usable screen real estate and enable users to view more application content on the screen, while still displaying a fully-usable keyboard.

FIG. 6 also illustrates an additional feature that can be added to a displayed single-hand keyboard, in accord with embodiments of the present invention. A slider 620 can be provided along the edges of the keyboard to allow for manual resizing of the keyboard once generated. Increasing or decreasing the size of the keyboard from the determined default can benefit users in several ways, including, for example, customizing the size based on finger reach level, and reducing the size of the keyboard to increase screen real estate.

Embodiments of the present invention can provide for a variety of user-selectable options, depending upon the nature of the application with which the single-handed keyboard is interacting. For example, the keyboard can support swipe gesturing to allow a user to toggle character case, numbers versus letters, special characters, and the like. In addition, the keyboard can support swipe entry of information (i.e., entering words without lifting a finger from the surface of the keyboard screen). A user can also the single-handed keyboard as an option to the normal full-width keyboard.

By now it should be appreciated that a new variation of a virtual keyboard has been provided that can be used by a single hand on any touch-enabled device. Embodiments provide an automatic determination of the desirability for a single-hand keyboard and an automatic determination of a best side of the screen on which the keyboard should be displayed for the particular user. Embodiments can also provide automatic sizing of the single-hand keyboard, and the sizing is determined based on a user's typing pattern and can also be determined through the nature of the application the user is accessing. Embodiments allow a user to type text while holding a large-format touchscreen device with both hands and prevents the need for any applications or physical keyboard to be attached. Embodiments are also tunable to serve typing needs of users with both short and long finger reach. As discussed above, the single-hand keyboard is customizable in that a user can define a location of the keyboard on the screen and adjust the size of the keyboard on the screen. Finally, embodiments utilizing the arc-shaped keep board increase screen real estate usable by applications by decreasing the amount of screen area used by the keyboard.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 7:
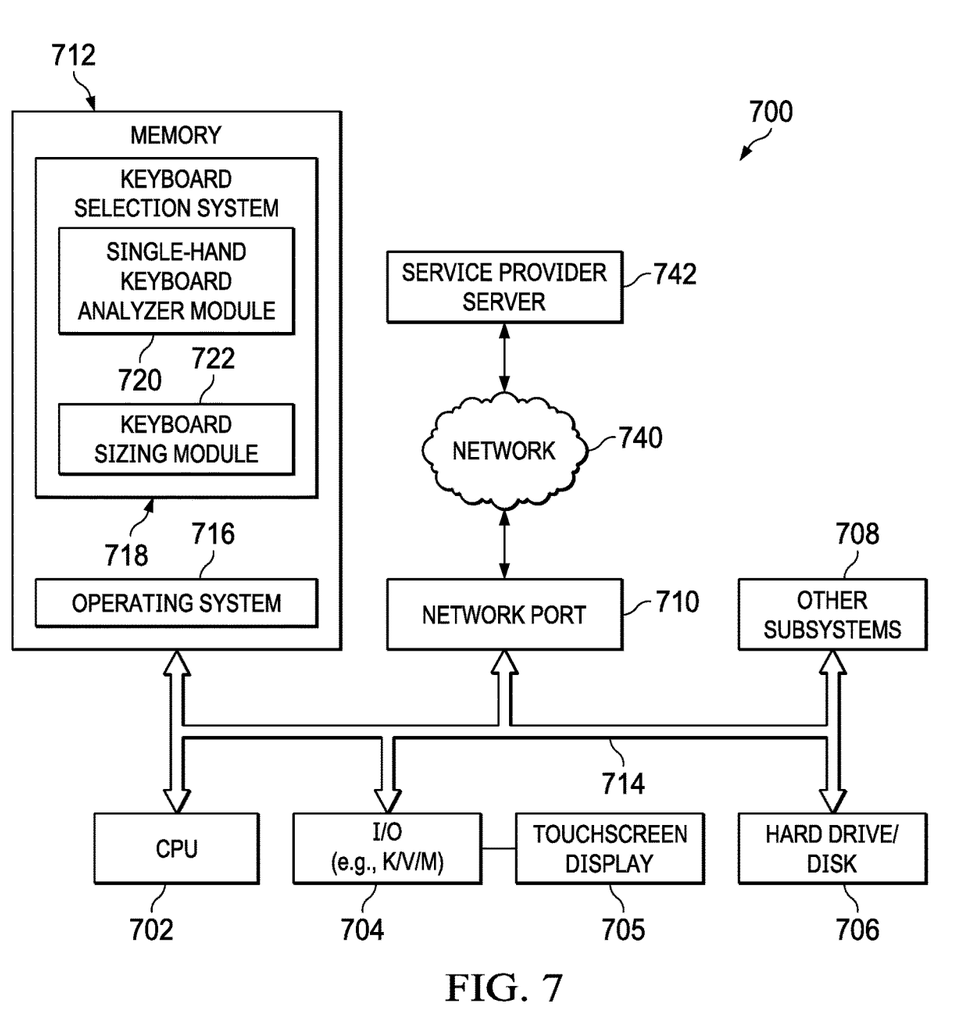
FIG. 7 is a generalized illustration of a touchscreen information handling system that can be used to implement the system and method of the present invention.

FIG. 7 is a generalized illustration of a touchscreen information handling system 700 that can be used to implement the system and method of the present invention. Touchscreen information handling system 700 includes a processor (e.g., central processor unit or "CPU") 702, input/output (I/O) devices 704, such as a mouse, and associated controllers, a touchscreen display 705, a hard drive or disk storage 706, and various other subsystems 708. In various embodiments, the information handling system 700 also includes network port 710 operable to connect to a network 740 (e.g., a wireless LAN), which is likewise accessible by a service provider server 742. The information handling system 700 likewise includes system memory 712, which is interconnected to the foregoing via one or more buses 714. System memory 712 further comprises operating system (OS) 716 and in various embodiments may also comprise keyboard selection system 118 providing one or more embodiments of the present invention.

Keyboard selection system 118 includes a single-hand keyboard analyzer module 720 that can determine desirability of a single-hand keyboard and whether that keyboard should be right- or left-handed, in accord with embodiments of the present invention. Keyboard selection system 118 further includes a keyboard sizing module 722 that can determine an optimal single-hand use keyboard size for a particular user, in accord with embodiments. The virtual keyboard selection and sizing operations improve operation of touchscreen information handling system 700 by improving ease of use and speed of input of virtual keyboards used to provide input to the system.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for selecting a virtual keyboard for a touchscreen device, the method comprising:
   monitoring flight times between keys of a first virtual keyboard displayed on a touchscreen display of the touchscreen device, wherein said monitoring comprises storing flight times for virtual keyboard key pairs, and a flight time comprises a time between release of a first key of a key pair and touching a second key of the key pair;
   determining, by a processor in the touchscreen device, that a single-hand virtual keyboard is indicated if flight times are different for defined regions of the first virtual keyboard;
   determining, by the processor, that the single-hand virtual keyboard is not indicated if flight times are not different for the defined regions of the first virtual keyboard; and
   displaying, on the touchscreen display, the single-hand virtual keyboard in response to said determining that the single-hand virtual keyboard is indicated.

2. The method of claim 1 wherein the first virtual keyboard is a virtual keyboard that extends a full width of the touchscreen display.

3. The method of claim 2, wherein the defined regions comprise a center region, a left region, and a right region.

4. The method of claim 3 wherein said determining that a single-hand virtual keyboard is indicated further comprises:
   determining that a left-hand keyboard is indicated when flight times from the center region to the left region are less than flight times from the center region to the right region; and
   determining that a right-hand keyboard is indicated when flight times from the center region to the right region are less than flight times from the center region to the left region.

5. The method of claim 1 further comprising:
   providing user-selection of a single-hand virtual keyboard if a single-hand virtual keyboard is not indicated, wherein said user selection further comprises selecting a left-hand or a right-hand keyboard.

6. The method of claim 1 further comprising:
   determining, by the processor, a first portion of the touchscreen display corresponding to an area of the first virtual keyboard having minimum flight times between keys; and
   locating the single-hand virtual keyboard in the first portion of the touchscreen display.

7. The method of claim 6 wherein all keys of the single-hand virtual keyboard are in the first portion of the touchscreen display.

8. The method of claim 7, wherein
   said displaying the single-hand virtual keyboard comprises displaying an arc-shaped virtual keyboard, and
   an outermost row of keys of the arc-shaped virtual keyboard are displayed in an arc defined by the keys of the first virtual keyboard having the minimum flight time.

9. A hand-held computing system comprising:
   a processor;
   a touchscreen display configured to display a virtual keyboard generated by the processor;
   a data bus coupled to the processor and the touchscreen display; and
   a non-transitory, computer-readable storage medium, coupled to the data bus, and storing computer program code executable by the processor, the computer program code comprising instructions configured to
   monitor flight times between keys of a first virtual keyboard displayed on the touchscreen display, wherein the instructions configured to monitor flight times comprise further instructions configured to store flight times for virtual keyboard pairs, and
   a flight time comprises a time between release of a first key of a key pair and touching a second key of the key pair;
   determine that a single-hand virtual keyboard is indicated if flight times are different for defined regions of the first virtual keyboard,
   determine that the single-hand virtual keyboard is not indicated if flight times are not different for the defined regions of the first virtual keyboard, and display, on the touchscreen display, the single-hand virtual keyboard in response to said determining that the single-hand virtual keyboard is indicated.

10. The system of claim 9, wherein the first virtual keyboard is a virtual keyboard that extends a full width of the touchscreen display.

11. The system of claim 10, wherein the defined regions comprise a center region, a left region, and a right region.

12. The system of claim 11, wherein the computer program code instructions configured to determine that a single-hand virtual keyboard is indicated comprise further instructions configured to
- determine that a left-hand keyboard is indicated when flight times from the center region to the left region are less than flight times from the center region to the right region; and
- determine that a right-hand keyboard is indicated when flight times from the center region to the right region are less than flight times from the center region to the left region.

13. The system of claim 9 wherein the computer program code comprises further instructions configured to provide user-selection of a single-hand virtual keyboard if a single-hand virtual keyboard is not indicated, wherein said user selection further comprises selecting a left-hand or a right-hand keyboard.

14. The system of claim 9, wherein the computer program code comprises further instructions configured to
- determine a first portion of the touchscreen display corresponding to an area of the first virtual keyboard having minimum flight times between keys; and
- locate the single-hand virtual keyboard in the first portion of the touchscreen display.

15. The system of claim 14, wherein all keys of the single-hand virtual keyboard are in the first portion of the touchscreen display.

16. The system of claim 15, wherein:
said displaying the single-hand virtual keyboard comprises displaying an arc-shaped virtual keyboard, and
an outermost row of keys of the arc-shaped virtual keyboard are displayed in an arc defined by the keys of the first virtual keyboard having the minimum flight time.

* * * * *